United States Patent
Mast et al.

(10) Patent No.: US 8,991,585 B2
(45) Date of Patent: Mar. 31, 2015

(54) RAIL CAR UNLOADING DEVICE

(71) Applicant: Mast Productions, Inc., Payson, IL (US)

(72) Inventors: Steve Joseph Mast, Quincy, IL (US); Brent Craig Mast, Payson, IL (US)

(73) Assignee: Mast Productions, Inc., Payson, IL (US)

( * ) Notice: Subject to any disclaimer, the term of this patent is extended or adjusted under 35 U.S.C. 154(b) by 96 days.

(21) Appl. No.: 13/782,760

(22) Filed: Mar. 1, 2013

(65) Prior Publication Data

US 2014/0246290 A1    Sep. 4, 2014

(51) Int. Cl.
*B65G 17/28* (2006.01)
*B65G 67/24* (2006.01)

(52) U.S. Cl.
CPC ..................... *B65G 67/24* (2013.01)
USPC ......... 198/313; 198/311; 198/861.5; 414/340

(58) Field of Classification Search
USPC ............ 198/317, 861.5, 313, 550.1; 414/339, 414/340, 362
See application file for complete search history.

(56) References Cited

U.S. PATENT DOCUMENTS

| | | | |
|---|---|---|---|
| 2,721,665 A * | 10/1955 | Goeke | 198/861.6 |
| 3,993,203 A | 11/1976 | Bartley | |
| 4,119,223 A * | 10/1978 | Fiechter | 414/523 |
| 4,491,216 A | 1/1985 | Sawby | |
| 4,531,877 A | 7/1985 | Carroll | |
| 4,690,603 A | 9/1987 | Graner | |
| 5,184,715 A | 2/1993 | Feterl | |
| 5,305,866 A | 4/1994 | Stewart et al. | |
| 5,360,097 A * | 11/1994 | Hibbs | 198/313 |
| 5,492,217 A | 2/1996 | Stewart | |
| 5,575,594 A | 11/1996 | Kurtz et al. | |
| 5,788,055 A | 8/1998 | Stewart et al. | |
| 6,068,103 A * | 5/2000 | Werner | 198/311 |
| 6,129,499 A | 10/2000 | Adams | |
| 6,312,206 B1 | 11/2001 | Pylate et al. | |
| 6,561,742 B1 | 5/2003 | Crawford et al. | |
| 7,191,889 B1 | 3/2007 | Heley | |
| 7,267,518 B2 * | 9/2007 | Kinzer | 414/272 |
| 7,270,061 B2 | 9/2007 | Ash | |
| 7,351,026 B2 | 4/2008 | Ash | |
| 7,381,023 B2 | 6/2008 | Ash | |
| 7,488,149 B2 | 2/2009 | Waldner | |
| 7,708,131 B2 * | 5/2010 | Muth | 198/315 |
| 2002/0125100 A1 | 9/2002 | Dennis | |
| 2003/0057055 A1 * | 3/2003 | Haukaas et al. | 198/313 |
| 2009/0038242 A1 * | 2/2009 | Cope | 414/809 |

* cited by examiner

Primary Examiner — James R Bidwell
(74) Attorney, Agent, or Firm — Armstrong Teasdale LLP

(57) ABSTRACT

A rail car unloading device is provided comprising a base, a hopper, and a support member. The base comprises a support plate. The support member is rotatably mounted to the base support plate. The hopper is mounted to the support member and the support member is rotatable with respect to the base between a first position where the hopper is placed beneath a rail car in an unloading position and a second position where the hopper is positioned in substantially parallel alignment with rail tracks such that a rail car may pass by the device.

18 Claims, 5 Drawing Sheets

RAIL CAR UNLOADING DEVICE

BACKGROUND

The field of the disclosure relates generally to systems for unloading bulk storage containers, and, more specifically, to systems for unloading bulk storage containers that are rotatable between two positions.

Bulk storage containers are typically used for transporting and/or storing bulk materials such as grain, agricultural products, fertilizers, chemicals, coal, minerals, ore, and other similar solid materials. Rail cars are one example of a bulk storage container and are often used to transport bulk materials (hereinafter referred to as "material"). The material is typically loaded into rail cars through an opening in a top portion of the rail car and unloaded through one or more discharge chutes positioned along an underside of the rail car.

Known rail car unloading systems are positioned in a pit below the tracks on which the rail car travels. Material discharged from the discharge chute of the rail car falls between the tracks and onto a conveyor positioned in the pit. The conveyor then carries the material out of the pit. Construction of the pit and associated conveyor systems is both costly and time-consuming as the pit and surrounding structure must support the weight of the rail car and the tracks positioned overhead. Moreover, once constructed and put in operation, known rail car unloading systems are not readily transported to another location.

BRIEF DESCRIPTION

In one aspect, a device for unloading a rail car on rail tracks is provided. The device includes a base including a track formed therein and a substantially vertical support member rotatably mounted to the base. The support member includes at least one vertical support leg, at least one wheel rotatably mounted to the at least one vertical support leg and configured for engagement with the track, and a base engaging member configured for rotatable engagement with the base. The base engaging member and the at least one wheel are configured to allow rotation of the support member with respect to the base. The device further includes a conveyor mounted to the support member, the conveyor including a hopper. The support member is configured to rotate between a first position where the hopper is positioned under the rail car and a second position where the hopper and the conveyor are in substantially parallel alignment with the rail tracks such that the rail car may pass by the device.

In another aspect, a bulk storage container unloading device is provided. The device includes a base including a support plate, a support member rotatably mounted to the support plate about an axis perpendicular to the base, and a hopper mounted to the support member. The support member is rotatable to a first position where the hopper is positioned beneath a discharge opening of a bulk storage container.

In another aspect, a rail car unloading device is provided. The device includes a base including a support plate, a support member rotatably mounted to the support plate, and a hopper mounted to the support member. The support member is rotatable between a first position where the hopper is positioned beneath a rail car for unloading and a second position where the hopper is positioned in substantially parallel alignment with rail tracks such that the rail car may pass by the device The features, functions, and advantages that have been discussed can be achieved independently in various embodiments of the present invention or may be combined in yet other embodiments further details of which can be seen with reference to the following description and drawings.

DETAILED DESCRIPTION

As further disclosed by the described embodiments, systems are described herein for the unloading of material from rail cars and bulk storage containers. The systems described herein include components that are movable between a first position where a hopper is positioned beneath the rail car or bulk storage container and a second position where the hopper is not positioned beneath the rail car or bulk storage container. The rail car or bulk storage container is thus able to be moved without interference from the system when the system is in the second position. While the embodiments disclosed herein reference a bulk storage container in the form of a rail car, it should be understood that the embodiments are equally well-suited for use with any bulk storage container, such as trucks, trailers, silos, or other containers. The rail car and bulk storage containers referenced herein are also capable of storing any bulk material. Examples include, without limitation, grain, agricultural products, fertilizers, chemicals, coal, and any other material that is capable of being conveyed by a material conveying system, such as, for example, an auger, a belt conveyor, a chain/paddle conveyor or a pneumatic receiving hopper.

Figure 1:
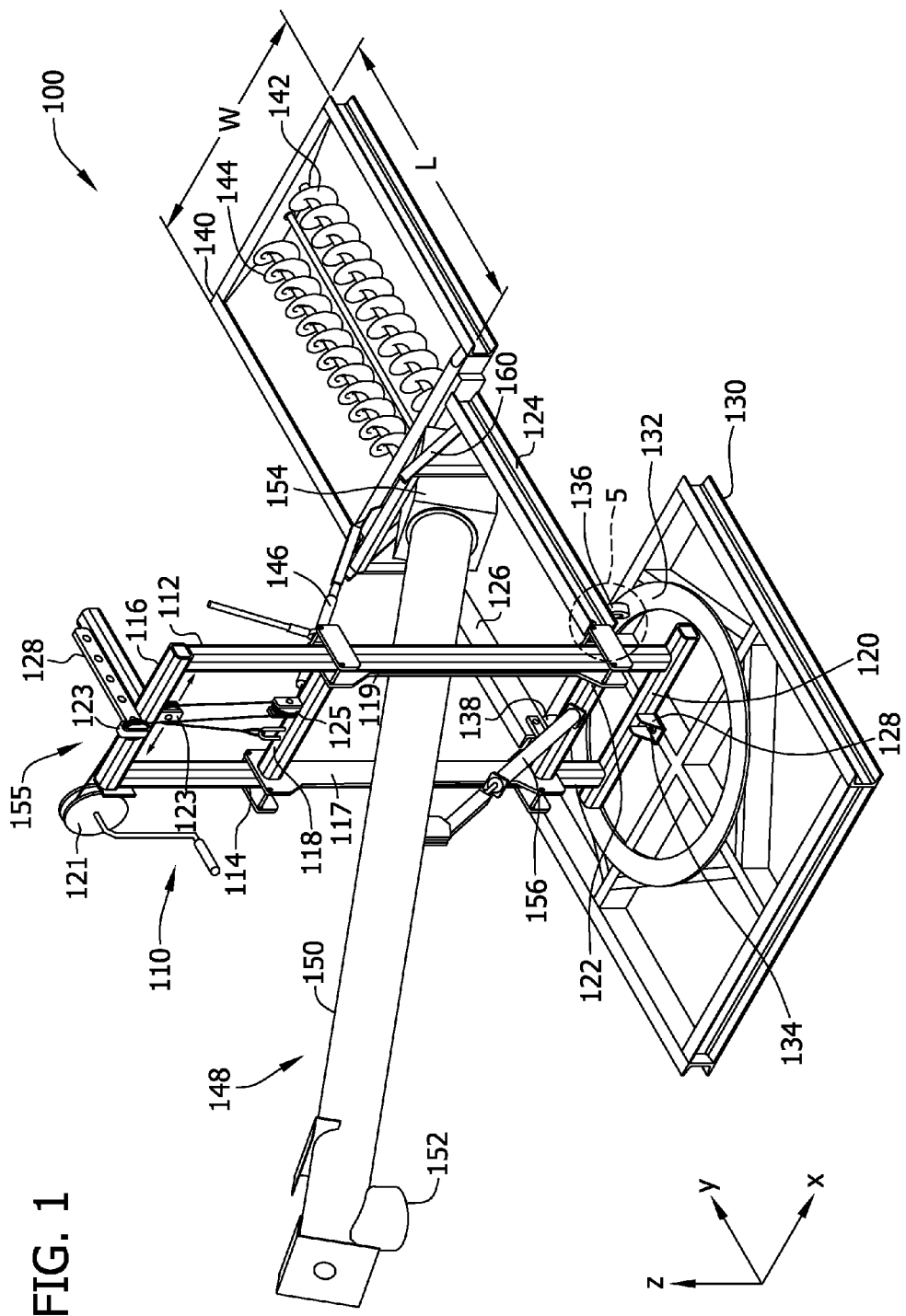
FIG. 1 is a perspective view of an exemplary rail car unloading device.

Referring more particularly to the drawings, embodiments of the disclosure may be described in the context of a system or device for unloading a rail car, generally indicated at 100 in FIG. 1. The system 100 includes a support member 110, a base 130, a hopper 140, and a conveyor 148. In the exemplary embodiment, conveyor 148 is an auger 150. However, conveyor 148 may be any type of conveyor that enables system 100 to function as described herein. For example, conveyor 148 may be a belt conveyor, a chain/paddle conveyor or a pneumatic receiving hopper. In one embodiment, a control system (not shown) is provided and comprises one or more computer processors, input/output devices, and computer readable forms of memory storing computer executable instructions thereon for controlling the operation of the system 100.

The support member 110 comprises a first vertical leg 112 and a second vertical leg 114. Each of the legs 112, 114 are coupled at respective upper ends to a first cross member 116 and at respective lower ends to a third cross member 120. The support member 110 also comprises a second cross member 118 coupled at one end to the first vertical leg 112 and at another end to the second vertical leg 114. A fourth cross member 122 is also coupled at one end to the first vertical leg 112 and at another end to the second vertical leg 114.

A first vertical member 117 and a second vertical member 119 are each coupled at respective upper ends to the second cross member 118 and at respective lower ends to the fourth cross member 122. The second cross member 118 and the fourth cross member 122 are slidably coupled to each of the legs 112, 114 such that the second and fourth cross members 118 and 122 slide in unison up and down the legs 112 and 114.

In the exemplary embodiment, a lift system 155 moves the second and fourth cross members 118 and 122 that are coupled by the first and second vertical members 117 and 119. The lift system 155 comprises a winch 121 and pulleys 123 coupled to the first cross member 116, and a pulley 125 coupled to the second cross member 118. The lift system 155 is operable to raise and lower the second and fourth cross members. In other embodiments, a lifting drive (not shown) is coupled to the base 130 and/or support member 110 and is operable to raise and lower the second and fourth cross members 118 and 122. The lifting drive is any device capable of generating linear motion, such as, but not limited to, a servo, a motor, hydraulics, or an actuator.

A lifting member 128 is coupled to the first cross member 116 and is configured for coupling to either of a chain, a rope, or a cable that is used to lift and position the system 100. In another embodiment, pocket-like structures may be disposed on the base 130 to aid in positioning of the system 100 with a forklift or other device. In still another embodiment, the base 130 of the system 100 may be anchored to the ground or another underlying structure. In still another embodiment, base 130 is excluded and system 100 may be anchored to the ground or another underlying structure.

A first outrigger 124 extends generally horizontally outward from the first vertical leg 112 of the support member 110. A second outrigger 126 also extends generally horizontally outward from the second vertical leg 114 of the support member. The outriggers 124, 126 are each pivotably coupled to the respective legs 112, 114 of the support member 110 such that the outriggers 124, 126 are able to pivot about the point where they are coupled to the respective legs 112, 114. Accordingly, the outriggers 124, 126, while generally horizontal, may be disposed at an angle other than 90 degrees with respect to the legs 112, 114. For example, the outriggers 124, 126 may be disposed at angles ranging between +/−60 degrees with respect to the legs 112, 114 of the support member 110.

The support member 110 is rotatably coupled to the base 130 by a base engaging member 134. The base engaging member 134 couples a member 128 to the third cross member 120. In the exemplary embodiment, the base engaging member 134 is a bolt that couples the member 128 to the third cross member 120 of the support member 110 to the base 130. In other embodiments, the base engaging member 134 may be a pin, bushing, bearing, or any other suitable device that couples the support member 110 to the base 130 while permitting rotation of the support member 110 relative to the base 130.

Figure 5:
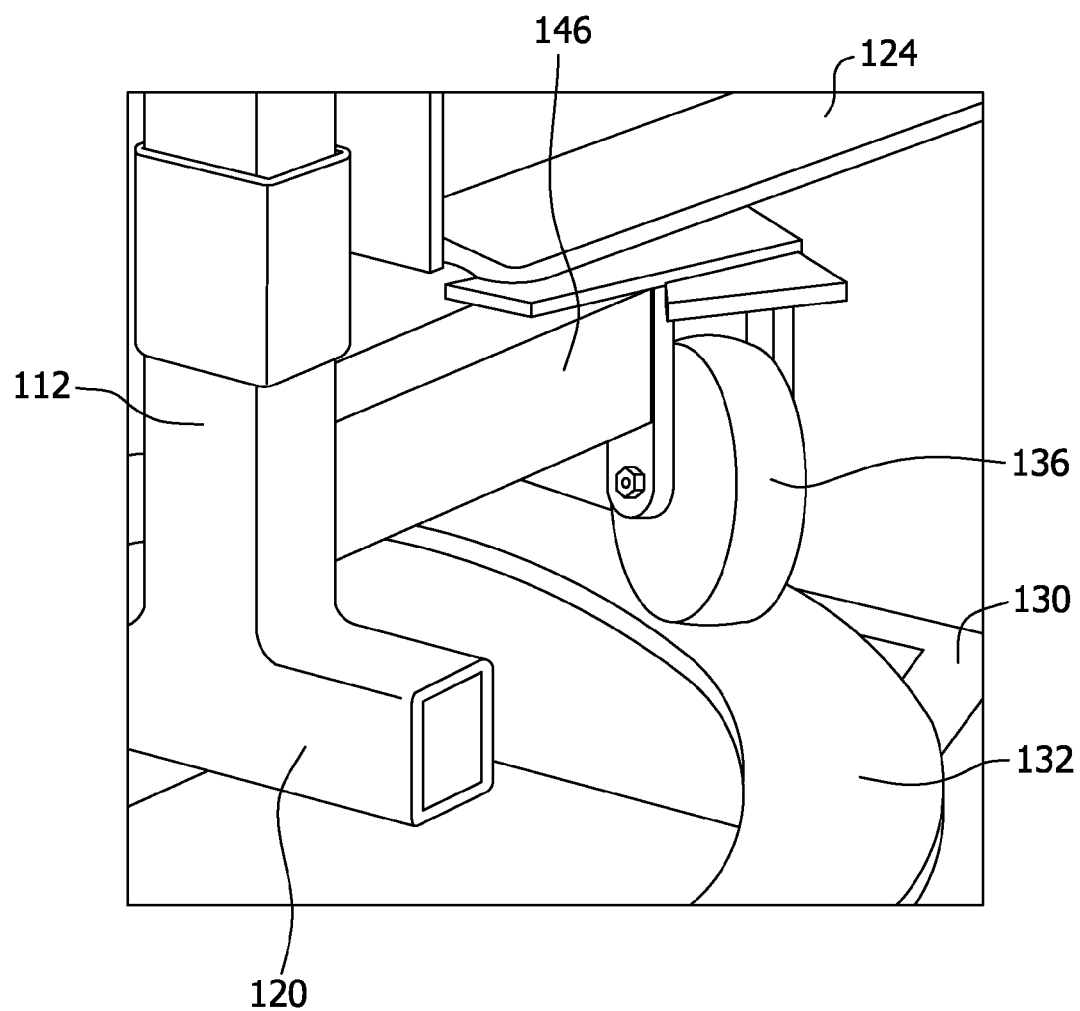
FIG. 5 is a perspective view of an enlarged portion of FIG. 1 illustrating a wheel system operable in the rotation of the unloading device between the first position and the second position.

As best shown in FIG. 5, a first wheel 136 is coupled to a first wheel support structure 146 and a second wheel 138 (FIG. 1) is coupled to a second wheel support structure (not shown). The first wheel support structure 146 is coupled to first vertical leg 112 and the second wheel support structure is coupled to the second vertical leg 114. The wheels 136, 138 support the weight of the support member 110 and the other components attached thereto. The wheels 136, 138 are disposed on and travel along a circular-shaped track 132 (broadly, a "support plate") coupled to the base 130. In alternative embodiments, track 132 may be any other shape including an oval, an ellipse, a semi-circle, etc. In other embodiments, a plate may be positioned atop the base 130 and the wheels 136, 138 travel along the plate rather than the track 132. The plate may be continuous and cover substantially all of the base 130, or the plate may not cover substantially all of the base 130. Moreover, in other embodiments the wheels 136, 138 are not used and instead the support member 110 is coupled to the base 130 by a bearing or other similar device. For example, one or more roller, ball, or thrust bearings can be used to rotatably couple the support member 110 to the base 130. In one embodiment, a locking pin (not shown) or other similar device is provided to lock or secure the system 100 in either the first position or the second position.

The base engaging member 134 and the wheels 136, 138 thus permit the support member 110 to rotate with respect to the base 130 about a vertical axis parallel to the z-axis and extending upward from the base engaging member 134. In the exemplary embodiment, the support member 110 is rotated manually by a human user. In other embodiments, a base drive (not shown) is coupled to the base 130 and/or the support member 110 and is operable to rotate the support member 110 with respect to the base 130. The base drive is any device capable of generating rotary motion, such as, but not limited to, a servo, a motor, or an actuator.

The hopper 140 is coupled to the first outrigger 124 and the second outrigger 126. The hopper 140 is sized for positioning beneath a rail car 200 (FIG. 2) such that the hopper 140 is able to fit between a discharge opening (not shown) of the rail car 200 and a set of tracks 210 along which the rail car 200 travels. The hopper 140 has a length L and a width W that are sized such that the hopper is approximately the same size or slightly larger than the discharge opening of the rail car 200. Moreover, a hopper actuator 146 is coupled at one end to the hopper 140 and at another end to the second cross-member 118. In the exemplary embodiment, the hopper actuator 146 is a turnbuckle-type device that increases in length when rotated about its longitudinal axis in one direction and decreases in length when rotated in the opposite direction. In another embodiment, the hopper actuator is a hydraulic, pneumatic, or electrical actuator that is capable of increasing or decreasing in length. As the hopper actuator 146 decreases in length, it lifts the hopper 140 in a direction generally parallel to the z-axis. Conversely, as the hopper actuator 146 increases in length it lowers the hopper 140 in a direction generally parallel to the z-axis. While the hopper actuator 146 is used in the exemplary embodiment to raise and lower the hopper 140, any other device may be used to raised and lower the hopper 140 without departing from the scope of the described embodiments.

The hopper 140 also includes a first hopper auger 142 and a second hopper auger 144 for conveying material discharged into the hopper 140 from the discharge chute of the rail car 140. Alternatively, or in addition, hopper 140 may include any type of conveyor that enables system 100 to function as described herein. The hopper augers 142, 144 are configured to convey material laterally in a direction generally parallel to the y-axis through an outlet of the hopper 140 and towards the auger 150. Although two hopper augers are illustrated, hopper 140 may have any number of hopper augers that enables system 100 to function as described herein. For example, hopper 140 may include four hopper augers. The hopper augers 142, 144 are coupled to one or more hopper auger drives (not shown) that are operable to rotate the hopper augers 142, 144. The hopper auger drives are any device capable of generating rotary motion, such as, but not limited to, a servo, a motor, or an actuator.

The hopper augers 142, 144 are configured to convey material into the auger 150. The auger 150 has an inlet end 154 positioned adjacent the hopper 140 and a discharge end 152 disposed on the opposite end of the auger 150 from the inlet end 154. Rotation of a screw-like structure disposed in the auger 150 conveys material from the inlet 154 to the discharge end 152. An auger drive (not shown) is coupled to and operable to rotate the structure. The auger drive is any device capable of generating rotary motion, such as, but not limited to, a servo, a motor, or an actuator.

The inlet end 154 of the auger 150 is positioned adjacent the hopper 140 such that the hopper augers 142, 144 convey material into the inlet end 154. A flexible coupling member may be used in the exemplary embodiment to couple the inlet end 154 to the hopper such that an angle between the hopper 140 and the auger 150 is adjustable. The auger 150 is coupled to the outriggers 124, 126 of the support member 110 by a pivot structure 160. The auger 150 is coupled to the pivot structure 160 by a pin or other suitable device that that permits the auger 150 to pivot about the inlet end 154. The auger 150 is thus able to pivot with respect to the hopper 140 while the hopper 140 remains stationary. In another embodiment, the auger 150 is pivotably coupled directly to the hopper and the pivot structure 160 is not used.

In one embodiment, an auger actuator 156 couples the auger 150 at approximately its mid-point to the fourth cross member 122 of the support member 110. In the exemplary embodiment, the auger actuator 156 is a double-acting hydraulic actuator that is configured to selectively increase and decrease in length upon being supplied with pressurized hydraulic fluid. In another embodiment, the hopper actuator is a pneumatic or electrical actuator that is capable of increasing or decreasing in length. As the auger actuator 156 increases in length, it lifts the discharge end 152 of the auger 150 in a direction generally parallel to the z-axis. Conversely, as the auger actuator 156 decreases in length it lowers the discharge end 152 in a direction generally parallel to the z-axis. While the auger actuator 156 is used in the exemplary embodiment to raise and lower the auger 150, any other device may be used to raised and lower the auger 150 without departing from the scope of the embodiments.

In one embodiment, a locking device (not shown) is provided for securing the auger 150 in a position relative to the hopper 140 such that the auger actuator 156 does not support the weight of the auger 150 at all times. For example, the auger actuator 156 can be used to adjust the position of the auger 150, and the discharge end 152 thereof, and once in position the locking device is used to support the weight of the auger 150. The locking device may thus comprise a rod, strut, or other rigid structure that couples the auger to the base 130 and/or support member 110.

Figure 2:
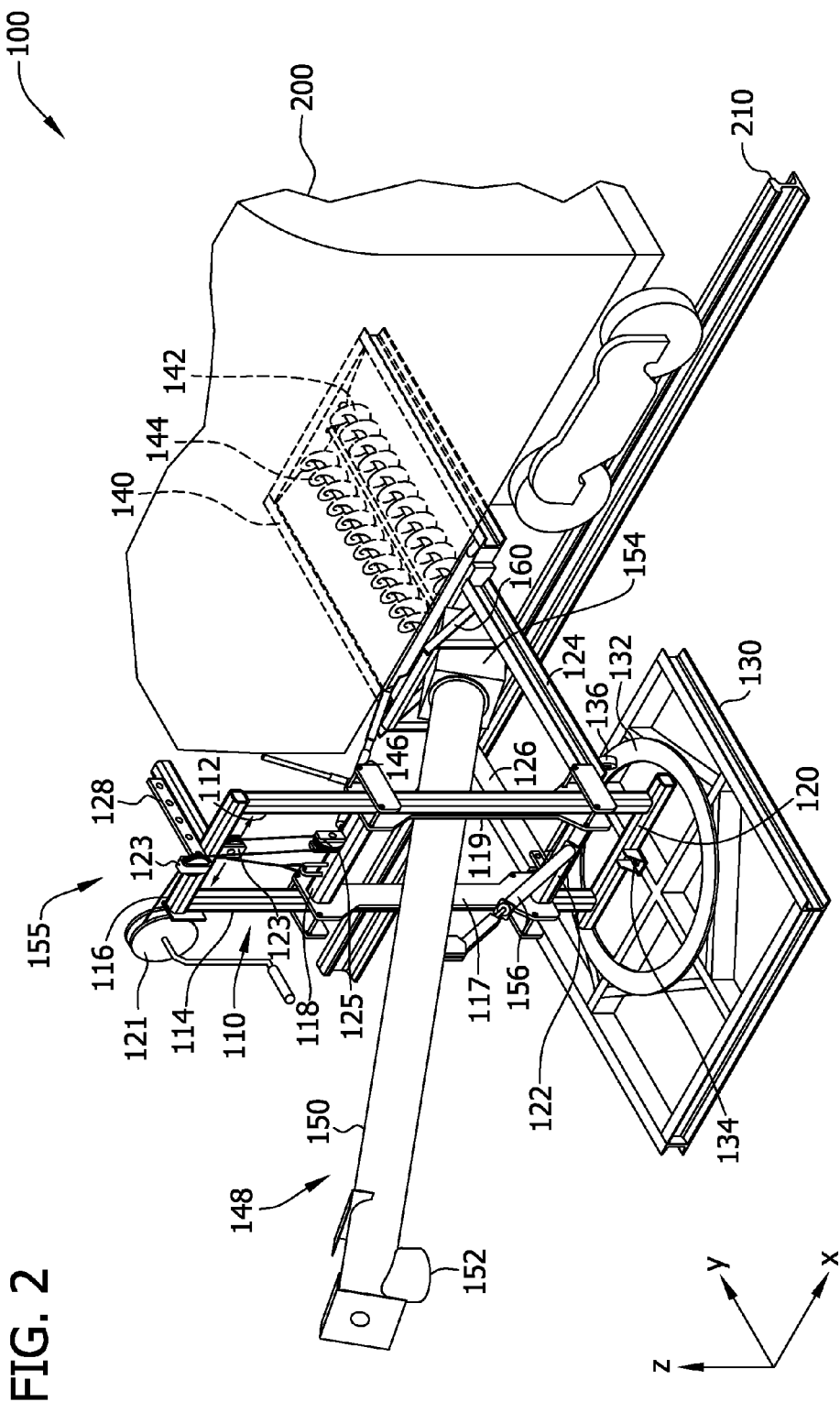
FIG. 2 is a perspective view of the rail car unloading device of FIG. 1 in a first position, with the hopper placed under a rail car and the chute substantially perpendicular to the rail car.
Figure 3:
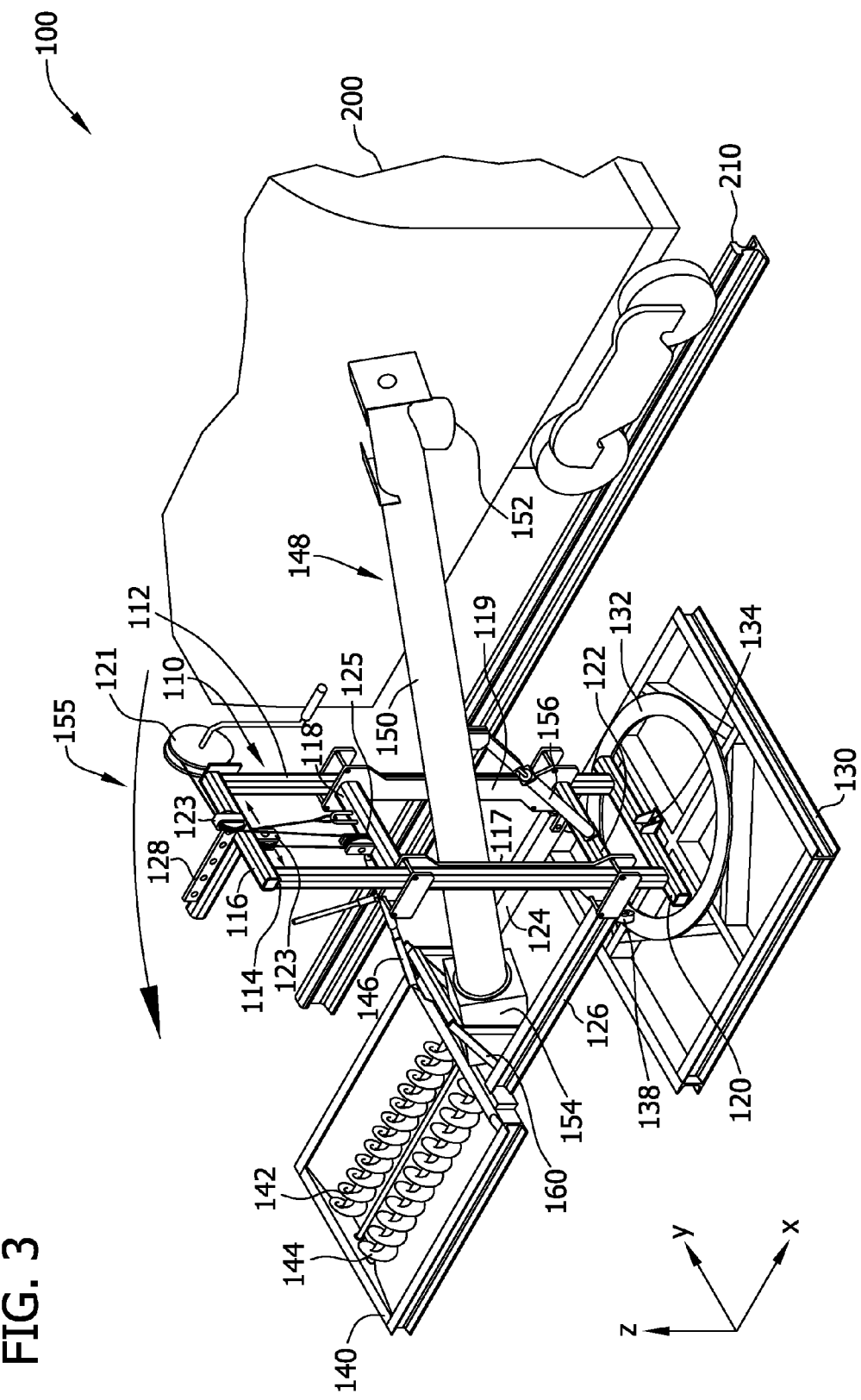
FIG. 3 is a perspective of the rail car unloading device of FIG. 1 in a second position, with the hopper and chute combination substantially parallel to the rail road rails.
Figure 4:
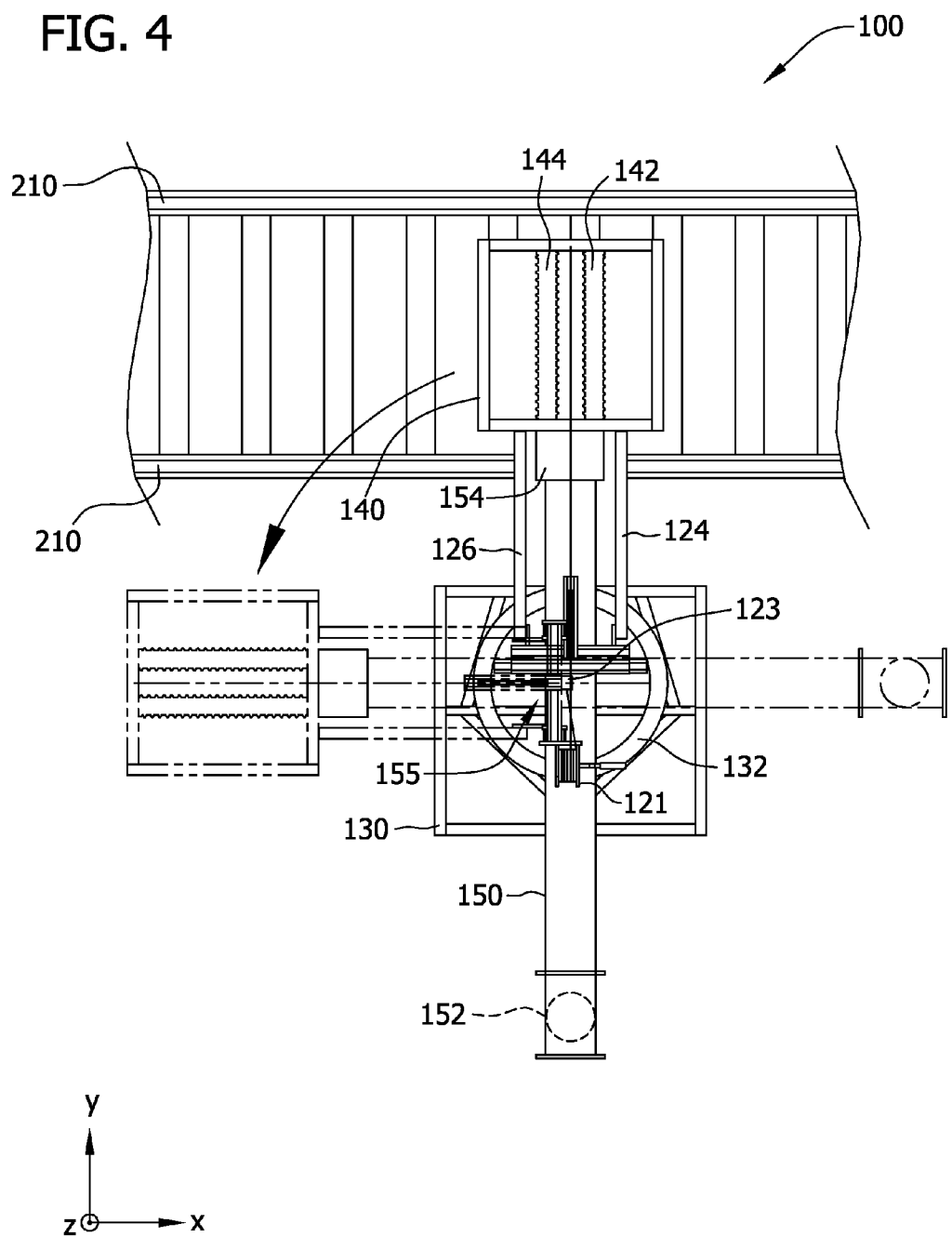
FIG. 4 is a top view of the rail unloading device of FIG. 1 illustrating rotation between the first position and the second position.

In operation, the system 100 is rotatable between a first position (broadly, an "unloading position") where the hopper 140 is positioned beneath the rail car 200 (FIG. 2) and a second position where the hopper 140 is positioned generally parallel the tracks 210 (FIG. 3). In the second position, the system 100, and specifically the hopper 140, does not interfere with movement of the rail car 200. The system 100 may be rotated between the two positions by a human user or the base drive. Moreover, as shown in FIGS. 2 and 3 the system 100 is generally positioned adjacent the tracks 210 and the rail car 200 such that the base 130 is at approximately the same elevation as the tracks.

Prior to commencement of unloading material from the rail car 200, the system 100 is rotated about the vertical axis extending from the base engaging member 134 in a direction generally parallel to the z-axis such that the hopper 140 is positioned beneath the discharge chute of the rail car 200. The hopper 140 is then raised by lift system 155 such that the hopper 140 is adjacent the discharge chute of the rail car 200. In some embodiments, the hopper 140 is raised to a position where it contacts or nearly contacts the discharge chute in order to prevent the material being unloaded from the rail car 200 from spilling or otherwise not falling into the hopper 140. The position of the discharge end 152 of the auger 150 is then adjusted by the lifting system 155 and/or the auger actuator 156 such that the discharge end 152 is positioned above a receptacle where the material will be conveyed by the auger 150.

Once the system 100 is in the first position and the hopper 140 and auger 150 have been positioned, material is unloaded from the rail car 200 through the discharge chute. A valve or other device coupled to the rail car 200 may be opened in order to allow material to fall through the discharge chute. Alternatively, the interior of the rail car 200 may be pressurized with air or another fluid in order to facilitate unloading of the material. The material then falls into the hopper 140 where rotation of the hopper augers 142, 144 conveys the material through the hopper 140 and into the inlet end 154 of the auger 150. Once the material is in the auger 150, rotation of the internal screw-like structure conveys the material along the length of the auger 150 to the discharge end 152 where the material is discharged into the receptacle.

Once the flow of material from the discharge chute has ended and the auger 150 has conveyed the material in the hopper 140 through the discharge end 152 thereof, the system 100 can be rotated to the second position shown in FIG. 3. As described above, the system 100 can be rotated manually by a human user or the base drive can be used to rotate the system 100. In the exemplary embodiment, the longitudinal axis of the auger 150 is generally parallel to the tracks 210 when the system 100 is in the second position such that the system 100 does not interfere with movement of the rail car 200. In other embodiments, the second position is any position of the system 100 where the system 100 does not interfere with movement of the rail car 200 and, as such, the longitudinal axis of the auger 150 need not be generally parallel to tracks 210. Moreover, in the exemplary embodiment the system 100 rotates in a counter-clockwise direction when rotating from the first position to the second position and a clockwise direction when rotating from the second position to the first position. In other embodiments, the system 100 rotates in a clockwise direction when rotating from the first position to the second position and a counter-clockwise direction when rotating from the second position to the first position.

Once material has been unloaded from the discharge chute of the rail car 200 and the system has rotated to the second position, the rail car 200 may be moved forward such that a second discharge chute of the rail car 200 is adjacent the system 100. The system 100 is then again rotated to the first position and the material is unloaded from the second discharge chute into the hopper 140 of the system 100. Accordingly, the system 100 is rotated back to the second position once the material has been unloaded from the second discharge chute of the rail car 200. The process then continues in a similar fashion for additional discharge chutes on the rail car 200 and additional rail cars.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device for unloading a rail car on rail tracks, the device comprising:
    a base comprising a track formed therein;
    a substantially vertical support member rotatably mounted to said base, said support member comprising:
        at least one vertical support leg;
        at least one wheel rotatably mounted to said at least one vertical support leg and configured for engagement with said track; and
        a base engaging member configured for rotatable engagement with said base, said base engaging member and said at least one wheel configured to allow rotation of said support member with respect to said base; and
    a conveyor mounted to said support member, said conveyor comprising a hopper, said support member configured to rotate between a first position where said hopper is positioned under the rail car and a second position where said hopper and said conveyor are in substantially parallel alignment with the rail tracks such that the rail car may pass by said device.

2. A rail car unloading device in accordance with claim 1 further comprising a conveyor drive for actuating at least a portion of said conveyor, wherein an inlet of said conveyor is coupled to said hopper.

3. A rail car unloading device in accordance with claim 2 wherein upon rotation of at least a portion of said conveyor by said conveyor drive, said conveyor conveys material unloaded from the rail car into said hopper away from said hopper.

4. A rail car unloading device in accordance with claim 1 wherein said conveyor is an auger.

5. A rail car unloading device in accordance with claim 1 further comprising at least one of a lift system and a conveyor actuator for moving said conveyor with respect to said support member.

6. A rail car unloading device in accordance with claim 5 wherein said conveyor is pivotably coupled to at least one of said hopper and said support member, wherein said conveyor is configured to pivot with respect to said support member when moved by said actuator.

7. A rail car unloading device in accordance with claim 1 further comprising a hopper actuator configured to move said hopper with respect to said support member.

8. A rail car unloading device in accordance with claim 7 wherein said hopper actuator is configured to raise and lower said hopper with respect to the rail car.

9. A bulk storage container unloading device comprising:
    a base comprising a support plate;
    a support member rotatably mounted to said support plate about an axis perpendicular to said base; and
    a hopper mounted to said support member, said support member rotatable to a first position where said hopper is positioned beneath a discharge opening of a bulk storage container; and
    a hopper actuator configured to move at least said hopper with respect to said support member.

10. A bulk storage container unloading device in accordance with claim 9 wherein said support member is rotatable to a second position wherein said device hopper is positioned such that the bulk storage container may be moved without interference from said unloading device.

11. A bulk storage container unloading device in accordance with claim 9 further comprising a conveyor mounted to at least one of an output of said hopper and said support member.

12. A bulk storage container unloading device in accordance with claim 9 wherein said hopper actuator is configured to raise and lower said hopper with respect to the bulk storage container.

13. A bulk storage container unloading device in accordance with claim 9 further comprising a base drive for rotating said support member about the axis perpendicular to said base.

14. A rail car unloading device comprising:
    a base comprising a support plate;
    a support member rotatably mounted to said support plate; and
    a hopper mounted to said support member, said support member rotatable between a first position where said hopper is positioned beneath a rail car for unloading and a second position where said hopper is positioned in substantially parallel alignment with rail tracks such that the rail car may pass by said device; and
    a hopper actuator configured to move at least said hopper with respect to said support member.

15. A rail car unloading device in accordance with claim 14 further comprising a conveyor mounted to at least one of said hopper and said support member, and a conveyor drive coupled to said conveyor and configured to actuate at least a portion of said conveyor.

16. A rail car unloading device in accordance with claim 14 further comprising a base drive for rotating said support member with respect to said base between the first position and the second position.

17. A rail car container unloading device in accordance with claim 14 wherein said hopper actuator is configured to raise and lower said hopper with respect to the rail car.

18. A rail car unloading device in accordance with claim 15 further comprising at least one of a lift system and a conveyor actuator for moving said conveyor with respect to said support member.

* * * * *